(12) United States Patent
Alba Pinto et al.

(10) Patent No.: US 7,457,970 B2
(45) Date of Patent: Nov. 25, 2008

(54) VLIW PROCESSOR WITH POWER SAVING

(75) Inventors: Carlos Antonio Alba Pinto, Eindhoven (NL); Ramanathan Sethuraman, Eindhoven (NL); Balakrishnan Srinivasan, Eindhoven (NL); Harm Johannes Antonius Maria Peters, Eindhoven (NL); Rafael Peset Llopis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 240 days.

(21) Appl. No.: 10/530,639

(22) PCT Filed: Sep. 17, 2003

(86) PCT No.: PCT/IB03/04183

§ 371 (c)(1),
(2), (4) Date: Apr. 6, 2005

(87) PCT Pub. No.: WO2004/034251

PCT Pub. Date: Apr. 22, 2004

(65) Prior Publication Data

US 2006/0156004 A1    Jul. 13, 2006

(30) Foreign Application Priority Data

Oct. 11, 2002   (EP) ................... 02079222

(51) Int. Cl.
*G06F 1/00*   (2006.01)

(52) U.S. Cl. .................. 713/300; 713/320; 713/324

(58) Field of Classification Search ............. 713/300, 713/320, 324
See application file for complete search history.

(56) References Cited

U.S. PATENT DOCUMENTS

| | | | |
|---|---|---|---|
| 5,790,877 A * | 8/1998 | Nishiyama et al. ........... 713/323 |
| 6,026,479 A | 2/2000 | Raje et al. |
| 6,195,753 B1 * | 2/2001 | Nakamura ................... 713/322 |
| 6,219,796 B1 | 4/2001 | Bartley |
| 6,345,362 B1 * | 2/2002 | Bertin et al. ................. 713/300 |
| 6,625,740 B1 * | 9/2003 | Datar et al. .................. 713/324 |
| 6,795,930 B1 * | 9/2004 | Laurenti et al. ............. 713/324 |
| 7,107,471 B2 * | 9/2006 | Feierbach .................... 713/324 |
| 7,114,089 B2 * | 9/2006 | Launiainen .................. 713/323 |
| 2003/0037221 A1 * | 2/2003 | Gschwind et al. .............. 712/3 |

* cited by examiner

*Primary Examiner*—Thomas Lee
*Assistant Examiner*—Vincent T Tran

(57) ABSTRACT

A data processing apparatus has an instruction memory system arranged to output an instruction word, capable of containing a plurality of instructions, respective instruction words being output in response to respective instruction addresses. An instruction execution unit contains a plurality of functional units, each capable of executing a respective instruction from the instruction word in parallel with execution of other instructions from the instruction word by other ones of the functional units. A power saving circuit is provided to switch a selectable subset of the functional units and/or parts of the instruction memory to a power saving state, while other functional units and parts of the instruction memory continue processing instructions in a normal power consuming state. The power saving circuit selects the functional units and/or parts of the instruction memory dependent on program execution.

12 Claims, 1 Drawing Sheet

VLIW PROCESSOR WITH POWER SAVING

Figure 1:
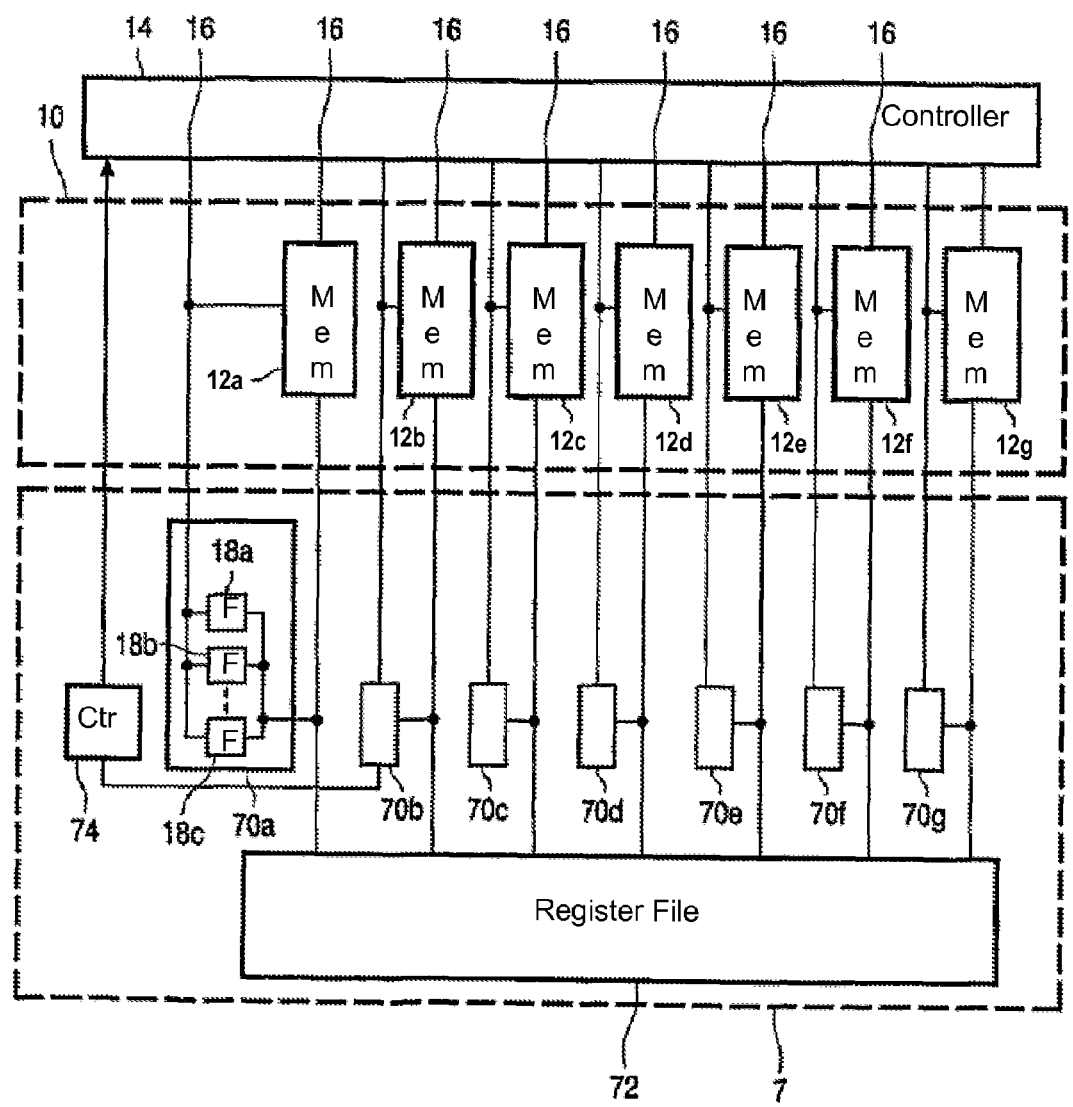

The invention relates to a data processing apparatus, such as a VLIW (Very Long Instruction Word) processor, that is capable of executing a plurality of instructions from an instruction word in parallel.

A VLIW processor makes it possible to execute programs with a high degree of instruction parallelism. Conventionally, in each instruction cycle the VLIW processor fetches an instruction word that contains a fixed number, greater than one, of instructions (often called operations). The VLIW processor executes these operations in parallel in the same instruction cycle (or cycles). For this purpose the VLIW processor contains a plurality of functional units, each capable of executing one of the operations from the instruction word at a time. Different kinds of functional units are typically provided, such as ALU's (arithmetic logics units), multipliers, branch control units, memory access units etc. Often dedicated purpose functional units are also included, designed to speed up programs for a particular applications. Thus, for example, functional units for performing parts of MPEG encoding or decoding may be added.

In advanced VLIW processors hundreds of functional units may be present. In principle, the instruction word may contain instructions for all of these functional units in parallel. Often the functional units are organized into groups of one or more functional unit, an instruction word providing one instruction per group. When at least some of the groups contain more than one functional unit grouping limits the length of the instruction word, without reducing the number of functional units.

All functional units inevitably consume power supply current. When a VLIW processor contains many functional units that operate in parallel, therefore, considerable power consumption occurs. This is inconsistent with requirements for battery-operated apparatuses. It may also increase the cost of cooling measures needed to operate the VLIW processor in a single package, due to the heating associated with power consumption.

U.S. Pat. No. 5,815,725 describes the use of clock gating to reduce power consumption in a microprocessor. A monitor circuit monitors whether the microprocessor enters a low activity operational state and if so it gates clock signals to the microprocessor. In U.S. Pat. No. 5,815,725 the clock gating involves disabling the clock signal in only part of the clock cycles, because the microprocessor must continue to operate. U.S. Pat. No. 5,661,751 describes clock gating during which the clock signal to a peripheral of a microprocessor (a UART) is completely disabled. Similarly, U.S. Pat. No. 6,345,336 describes disabling of clock signals of part of a cache memory.

Clock gating reduces power consumption but when applied to the instruction execution part of a processor it has the disadvantage that it reduces the capability of executing instructions. Significantly, U.S. Pat. No. 5,661,751 and U.S. Pat. No. 6,345,336 apply clock gating to peripheral or auxiliary circuits and not to the instruction execution circuit or the whole instruction memory. U.S. Pat. No. 5,815,725 attempts to mitigate the problem of complete disabling of the clock signal of the microprocessor by disabling the clock signal only in part of the clock cycles. Nevertheless the rate of instruction execution is reduced.

Among others, it is an object of the invention to provide for a data processing apparatus which uses power saving measures during execution of instructions to reduce power supply consumption without reducing the rate at which instructions can be executed.

The invention provides for a data processing apparatus according to claim 1. This data processing apparatus is of a type, such as a VLIW processor, that processes instruction words that each contain a plurality of instructions. Different functional units execute the instructions from an instruction word in parallel. According to the invention the processing apparatus is constructed so that it is made possible to apply power saving measures, such as clock gating, selectively to part of the functional units and/or memory units that supply instructions to respective ones of the functional units or groups of functional units, dependent on program execution. In the memory units in particular much power can be saved.

The invention is based on the insight that there exist useful application programs in which the utilization of functional units varies from one program section to another. In such applications it can be determined in advance which functional units will be used in which section. For example, in a program that involves MPEG encoding, specialized functional units for specific tasks in such encoding are only used in specific sections. When the processor executes instruction words from a program section power saving may be used to disable clock signals of the functional units and/or memory units that are known not to be used in that section.

When the instruction word contains a field dedicated for instructions for a functional unit in which power saving measures are applied, the apparatus may automatically also apply power saving measures to the section of instruction memory that provides that field when clock gating is applied to that functional unit. More generally, the processing apparatus may apply power saving measures to any resources, such as a register file or peripheral circuits, that are dedicated to the functional unit to which power saving measures are applied.

It has also been discovered that in many useful application programs the utilization of different functional units is correlated. In a program section where one functional unit is not used, certain correlated functional units are not used either. Therefore it is advantageous to combine such functional units into a group and to arrange the circuit so that clock gating disables clock signals to all functional units in the group. When the group contains no functional units that are used in a program section, clock gating can be used to disable clock signals to all of the functional units of the group. Moreover, when resources are shared per group of processors clock gating can also be applied to the resources.

These and other objects and advantageous aspects of the processing apparatus and method of processing according to the invention will be described in more detail with reference to FIG. 1, which shows a processing apparatus.

FIG. 1 shows a processing apparatus that contains a memory system 10, with memory units 12*a-g*, a controller 14, and an instruction execution unit 7 that contains groups 70*a-g* of functional units 18*a-c*, a register file 72 and an instruction address counter unit 74. Instruction address counter unit 74 has an instruction address output coupled to controller 14. Controller 14 has selection outputs 16 coupled to memory units 12*a-g* and to groups 70*a-g*. Furthermore, controller 14 has address outputs coupled to memory units 12*a-g*. Memory units 12*a-g* have instruction outputs coupled to respective ones of groups 70*a-g* and to register file 72. Register file has operand/result output/input ports (not shown separately) coupled to groups 70*a-g*. Groups 70*a-g* each contain one or more functional unit 18*a-c* (the functional units of only one group being shown explicitly), which all have clock gating inputs coupled to the selection outputs 16 of controller 14, operation code inputs coupled to memory units 12*a-g*, operand inputs coupled to register file 72 and result outputs coupled to register file 72 (all except the clock gating inputs being symbolized by a single connection between memory units 12*a-g*, groups 70*a-g* of functional units 18*a-c* and the register file 72.). One of groups 70*a-g* has a branch address output coupled to instruction address counter unit 74.

In operation the processing apparatus operates in successive instruction cycles. In successive instruction cycles address counter unit 74 outputs addresses of successive instructions to controller 14 (these instructions will be called "successive" because the corresponding instructions are executed successively, although in the case of branches the addresses may not be successive). Controller outputs further instruction addresses derived from the instruction address to memory units 12*a-g*. The further instruction addresses address instruction memory locations in memory units 12*a-g*. Memory units 12*a-g* output instructions from the addresses to instruction execution unit 7. The combination of instructions output from memory units 12*a-g* forms an instruction word with fields for the various instructions.

Controller 14 also outputs selection signals which are applied to the memory units 12*a-g*. Each selection signal indicates whether an instruction from a respective memory unit 12*a-g* is needed for the current instruction cycle. When the selection signal indicates that no instruction is needed from a particular memory unit 12*a-g* the memory unit is switched to a power saving state, for example by disabling clock signals in that particular memory unit 12*a-g*. These clock signals include for example the clock signal that signals the output driver of the memory unit to change the instruction output from the particular memory unit 12*a-g*, or the clock signal used to precharge bit lines and/or word lines etc. When these clock signals are disabled power is saved, for example because no charging current for outputs, bit lines and/or word lines is needed. Other ways of saving power include disconnecting a power supply source from circuits that need not retain a state during power saving.

Each group 70*a-g* of functional units 18*a-c* receives an instruction from a respective one of memory units 12*a-g* and the selection signal that is applied to that memory unit 12*a-c*. The selection signal controls whether the group of functional units is switched to a power saving state, for example by disabling clock signals in the functional units 18*a-c* in groups 70*a-g*. The disabled clock signals include for example clock signals that cause logic transitions in the output signals from output drivers of functional units 18*a-c*, or clock signals involved in precharging signal lines. Also, some functional unit contain data memory that consumes less power when the clock is disabled. When these clock signals are disabled power is saved, for example because no charge current for outputs or signal lines is needed.

In those groups where the selection signal does not indicate that clock signals should be disabled, the functional units 18*a-c* of the group 70*a-g* determine which of the functional units 18*a-c* of the group 70*a-g* should execute the instruction from the corresponding memory unit 12*a-g*, and that functional unit reads operands addressed by the instruction from register file 72 (if any) and supplies results to register file 72 (if any).

Although it is preferred that clocks are disabled both in cooperating memory units 12*a-g* and in groups 70*a-g*, it will be understood that a power advantage is already gained when clock signals are disabled in only one of them.

Controller 14 is capable of selecting and deselecting memory units 12*a-g* and/or groups 70*a-g* independently of other memory units 12*a-g* and/or groups 70*a-g*. Selection may be controlled in various ways. In one embodiment memory mapping information is used that is loaded into a control memory (not shown) in controller 14 prior to execution of a program of instruction words from memory units 12*a-g*. In this case the memory mapping information indicates for a number of address ranges of instruction addresses from instruction address counter unit 74 which of the selection signals should be activated. When controller 14 receives an instruction address from instruction address counter unit 74 it detects the address range that contains the instruction address and supplies the selection signals stored for that address.

In another embodiment subsequent switching off or on of selected selection signals is commanded from the instruction words that are executed by execution unit 7. For this purpose a special selection control functional unit may be provided in one of the groups 70*a-c*, that executes instructions which contain indications of the groups 70*a-g* that should receive selection signals. Such an instruction may for example be in the form of a mask with respective bits for different groups, to indicate whether or not the group should be selected or not, or in the form of numbers that indicate a group whose selection should be activated or deactivated. Thus, different subsets of (groups of) functional units in which clock signals are to be disabled can be selected. In an extremely simple embodiment, wherein clock signals can be disabled only in one such subset, the command need not specify the subset.

Although FIG. 1 shows that all groups 70*a-g* receive selection signals, it will be understood that the invention is not limited to use of selection signals for all groups. In practice controller 14 may not have a selection output for some of the groups 70*a-g* and these some of the groups may not have a selection input. Thus, these groups are always active. Preferably, at least one group is always active. Also, although each group is shown to receive its own independently settable selection signal, it will be understood that in practice some groups may receive a shared selection signal. Furthermore, although all groups have been shown without distinctions, it will be understood that the groups may in fact differ: functional units in some groups may receive literal data, such as branch addresses or constants from memory units 12*a-g*, whereas others merely receive operation codes, data being supplied from register file 72, some groups may receive larger numbers of operands than others, or produce larger numbers of results.

As shown, one of the groups 70*a-g* has a connection from a branch functional unit (not shown) to update the instruction address in instruction address counter unit 74 in response to an instruction. The branch functional unit executes this update for example when it determines that some condition has been met. Updates may be absolute (replacement of program counter value in address counter unit 74) or relative (addition to the program counter value). This is shown by way of example. In practice more than one group 70*a-g* may contain one or more branch functional units coupled to instruction address counter unit 74.

Furthermore, although separate memory units 12*a-g* have been shown for respective groups of functional units 70*a-g*, it will be understood that some groups may share a memory unit 12*a-g*, so that the memory unit produces instructions for these groups in parallel (in general these memory units will have wider instruction output than other ones of memory units 12*a-g*). Of course, clock signals are disabled in such a memory unit, if at all, only when none of the groups of functional units 70*a-g* that is connected to the memory units 12*a-g* needs an instruction. This can be implemented using a detector to determine whether none of the relevant groups of functional units needs an instruction, or it may be indicated by instructions from the program.

Furthermore, in some designs register file 72 may be split into a number of register files; some of which are coupled only to a subset of groups 70*a-g* of functional units 18*a-c*, sometimes even only to one group 70*a-g*, in which case that register file can be regarded as part of the relevant group. In the latter case, power saving may be applied to the register file that is only connected to one of the groups 70*a-g* that is not currently selected, for example by disabling clock signals in that register file. When more than one group has access to a register file power saving may be applied to that register file when the selection signals from controller 14 disable clock signals in all of the groups that have access to the register file. Controller 14 may be provided with a separate selection output for this register file for this purpose, so that power saving in the register file can explicitly be controlled. Alternatively, a detection circuit may be provided to detect whether the selection signals of all involved groups 70a-g signal that power saving should be applied and if so the detection circuit signals that power saving should be applied to the register file as well.

In practice the processing apparatus may use pipelining of instruction execution. That is, in the same instruction cycle controller 14 may process one instruction address, memory units 12a-g may retrieve instructions for a preceding instruction address and functional units 18a-c may process one or more processing stages for one or more yet further preceding instruction address. In this case, power saving or more particularly disabling of clock signals may also be pipelined, for example by delaying the selection signals from controller 14 by different numbers of instruction cycles for memory units 12a-g and different pipeline stages of functional units 18a-c.

Prior to program execution, it should preferably be determined which program parts need which groups 70a-g of functional units. This is a matter of taking account of specialized functions of the functional units 18a-c, but it may also depend on the different required amounts of parallelism in different parts of the program. For example, a higher amount of parallelism may be needed inside an inner loop.

Programming of the data processing apparatus starts with determination of a description of the operations that have to be performed, for example compiled from a program in a high level computer language. Subsequently, a step is performed to map the operations to functional units. This mapping step allows for some mapping freedom. For example, some arithmetic and logic operations could be performed sequentially on one arithmetic logic functional unit, or in parallel on different arithmetic logic functional units. During the mapping step, an inner loop and surrounding parts of the program may be identified (which are executed many times and only once or a few times, respectively, each time when the program is executed). In this case, the operations of the inner loop are preferably mapped to allow parallel execution in different functional units, whereas operations from the surrounding parts are preferably mapped to one or a limited subset of the functional units, using sequential execution. Moreover, during the mapping step some operations can only be mapped to specific functional units or a group of functional units. Certain MPEG encoding or encoding functions are examples of this.

In a selection step, the combinations of (groups of) functional units that are used in respective sections of the program are identified and information is compiled that indicates which combinations are used in which sections. This information is subsequently used during execution of the program to disable clock signals selectively in those (groups of) functional units that are not used in a section when instructions from the section are executed, for example in the form of memory mapping information or in the form of commands to disable or enable clock signals in selected functional units.

The invention claimed is:

1. A data processing apparatus comprising:
   an instruction memory system arranged to output an instruction word, capable of containing a plurality of instructions, respective instruction words being output in response to respective instruction addresses;
   an instruction execution unit, comprising a plurality of functional units, each capable of executing a respective instruction from the instruction word in parallel with execution of other instructions from the instruction word by other ones of the functional units;
   a power saving circuit arranged to switch a selectable subset of the functional units and/or parts of the instruction memory that supply instructions from the instruction word to the functional units to a power saving state during program execution, the power saving circuit being arranged to select the functional units and/or parts of the instruction memory in the subset dependent on program execution;
   wherein:
   the instruction memory system includes a plurality of memory units, each for supplying a respective instruction field in the instruction word for an instruction for a respective functional unit or group of functional units, the clock gating circuit being arranged to switch those memory units to the power saving state that supply the instruction field for the selectable ones of the functional units that are switched to the power saving state, and
   the memory units each comprise memory locations for at least a part of each instruction words only for instruction words in a respective range of instruction addresses, the instruction memory system allowing for partial overlap of the respective ranges of different ones of the memory units.

2. A data processing apparatus comprising:
   an instruction memory system arranged to output an instruction word, capable of containing a plurality of instructions, respective instruction words being output in response to respective instruction addresses;
   an instruction execution unit, comprising a plurality of functional units, each capable of executing a respective instruction from the instruction word in parallel with execution of other instructions from the instruction word by other ones of the functional units;
   a power saving circuit arranged to switch a selectable subset of the functional units and/or parts of the instruction memory that supply instructions from the instruction word to the functional units to a power saving state during program execution, the power saving circuit being arranged to select the functional units and/or parts of the instruction memory in the subset dependent on program execution;
   wherein the power saving circuit is arranged to select the subset dependent an instruction address associated with the instruction word.

3. The apparatus of claim 2, wherein clock signals to the functional units and/or parts of the instruction memory in the subset are disabled in the power saving state.

4. The apparatus of claim 2, wherein the functional units are organized into groups of one or more functional units each, the functional unit or units in each respective group receiving instructions from a respective instruction field in the instruction word, each time for execution by one of the functional units in the group, the power saving circuit selecting the functional units that are switched to the power saving state per group.

5. The apparatus of claim 2, wherein the instruction memory system comprises a plurality of memory units, each for supplying a respective instruction field in the instruction word for an instruction for a respective functional unit or group of functional units, the power saving circuit being arranged to switch those memory units to the power saving state that supply the instruction field that for the selectable ones of the functional units that are switched to the power saving state.

6. The apparatus of claim 2, wherein the power saving circuit is arranged to select the subset under control of one or more instructions contained in a program executed by the data processing apparatus.

7. The apparatus of claim 6, wherein the one or more instructions specify the subset.

8. A method of executing a program of instructions using the apparatus of claim 2, the method comprising identifying a part of the program wherein the instruction word does not contain instructions for functional units in a particular one of the groups, and using the power saving circuit to switch to the power saving state the functional units that not contained in the particular one of the groups and/or memory units that are coupled to the particular one of the groups, during executing of the identified part of the program.

9. The apparatus of claims 2, including:
   a control memory that is configured to store a plurality of address ranges of the instruction addresses associated with the instruction words, and
   a controller that is configured to control the power saving circuit based on a comparison of an address of a current instruction word to the address ranges.

10. A data processing apparatus comprising:
    an instruction memory system arranged to output an instruction word, capable of containing a plurality of instructions, respective instruction words being output in response to respective instruction addresses;
    an instruction execution unit, comprising a plurality of functional units, each capable of executing a respective instruction from the instruction word in parallel with execution of other instructions from the instruction word by other ones of the functional units; and
    a power saving circuit arranged to switch a selectable subset of the functional units and/or parts of the instruction memory that supply instructions from the instruction word to the functional units to a power saving state during program execution, the power saving circuit being arranged to select the functional units and/or parts of the instruction memory in the subset dependent on program execution;
    wherein at least one of the functional units is configured to:
       receive a power saving instruction from the instruction word, and
       control the power saving circuit to switch at least one other functional unit to the power saving state based on the power saving instruction.

11. The apparatus of claim 10, wherein clock signals to the functional units and/or parts of the instruction memory in the subset are disabled in the power saving state.

12. The apparatus of claim 10, wherein the instruction memory system comprises a plurality of memory units, each for supplying a respective instruction field in the instruction word for an instruction for a respective functional unit or group of functional units, the clock power saving circuit being arranged to switch those memory units to the power saving state that supply the instruction field that for the selectable ones of the functional units that are switched to the power saving state.

* * * * *